(12) United States Patent
Shibui

(10) Patent No.: US 7,487,004 B2
(45) Date of Patent: Feb. 3, 2009

(54) TOOL SELECTION METHOD FOR MACHINE TOOL, CONTROL DEVICE, AND NUMERICALLY CONTROLLED LATHE

(75) Inventor: Yutaka Shibui, Saku (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 10/522,760

(22) PCT Filed: Jul. 28, 2003

(86) PCT No.: PCT/JP03/09541

§ 371 (c)(1),
(2), (4) Date: Oct. 18, 2005

(87) PCT Pub. No.: WO2004/011193

PCT Pub. Date: Feb. 5, 2004

(65) Prior Publication Data

US 2006/0095155 A1 May 4, 2006

(30) Foreign Application Priority Data

Jul. 30, 2002 (JP) ............................ 2002-221402

(51) Int. Cl.
G06F 19/00 (2006.01)
G06K 1/04 (2006.01)

(52) U.S. Cl. .................... 700/179; 700/193; 234/59
(58) Field of Classification Search .................. 700/96, 700/159, 179, 193; 483/17, 18; 82/1.11; 234/59

See application file for complete search history.

(56) References Cited

U.S. PATENT DOCUMENTS 3,710,466 A * 1/1973 Williamson et al. ......... 29/27 R
3,868,763 A * 3/1975 Sato ............................ 483/8

(Continued)

FOREIGN PATENT DOCUMENTS

JP 57-021247 2/1982

(Continued)

OTHER PUBLICATIONS

Office Action dated Sep. 2, 2008 (corresponding Japanese application).

*Primary Examiner*—Kamini Shah
*Assistant Examiner*—Sheela Rao
(74) *Attorney, Agent, or Firm*—Finnegan, Henderson, Farabow, Garrett & Dunner, L.L.P.

(57) ABSTRACT

A tool selection method, for a machine tool, comprising the steps of identifying the maximum tip distance (D2) of a currently selected tool (141), a next designated tool (142) and an intermediate tool (143) disposed therebetween; moving a tool rest (10) in the +(plus)X-axis direction after a machining by the currently selected tool (141) is completed until the tip of the currently selected tool (141) is spaced from a workpiece (W) along the X-axis by a distance provided by adding a clearance distance (E) to a difference between the maximum tip distance (D2) and the tip distance (D3) of the currently selected tool (141); moving the tool rest (10) in the +(plus) Y-axis direction until the tip of the next designated tool (142) is aligned with the rotation center axis (12a) of the workpiece (W) in the X-axis direction; and moving the tool rest (10) in the –(minus)X-axis direction.

5 Claims, 7 Drawing Sheets

U.S. PATENT DOCUMENTS

| | | | |
|---|---|---|---|
| 4,033,206 A * | 7/1977 | Morita et al. | 82/118 |
| 4,369,563 A * | 1/1983 | Williamson | 483/7 |
| 6,636,777 B1 * | 10/2003 | Kokubo et al. | 700/193 |
| 6,817,111 B1 * | 11/2004 | Corrado | 33/632 |

FOREIGN PATENT DOCUMENTS

| | | |
|---|---|---|
| JP | 62-139004 | 6/1987 |
| JP | 2-41842 A | 2/1990 |
| JP | 8-118203 A | 5/1996 |
| JP | 08-263115 | 10/1996 |
| JP | 2002-205243 | 7/2002 |

* cited by examiner

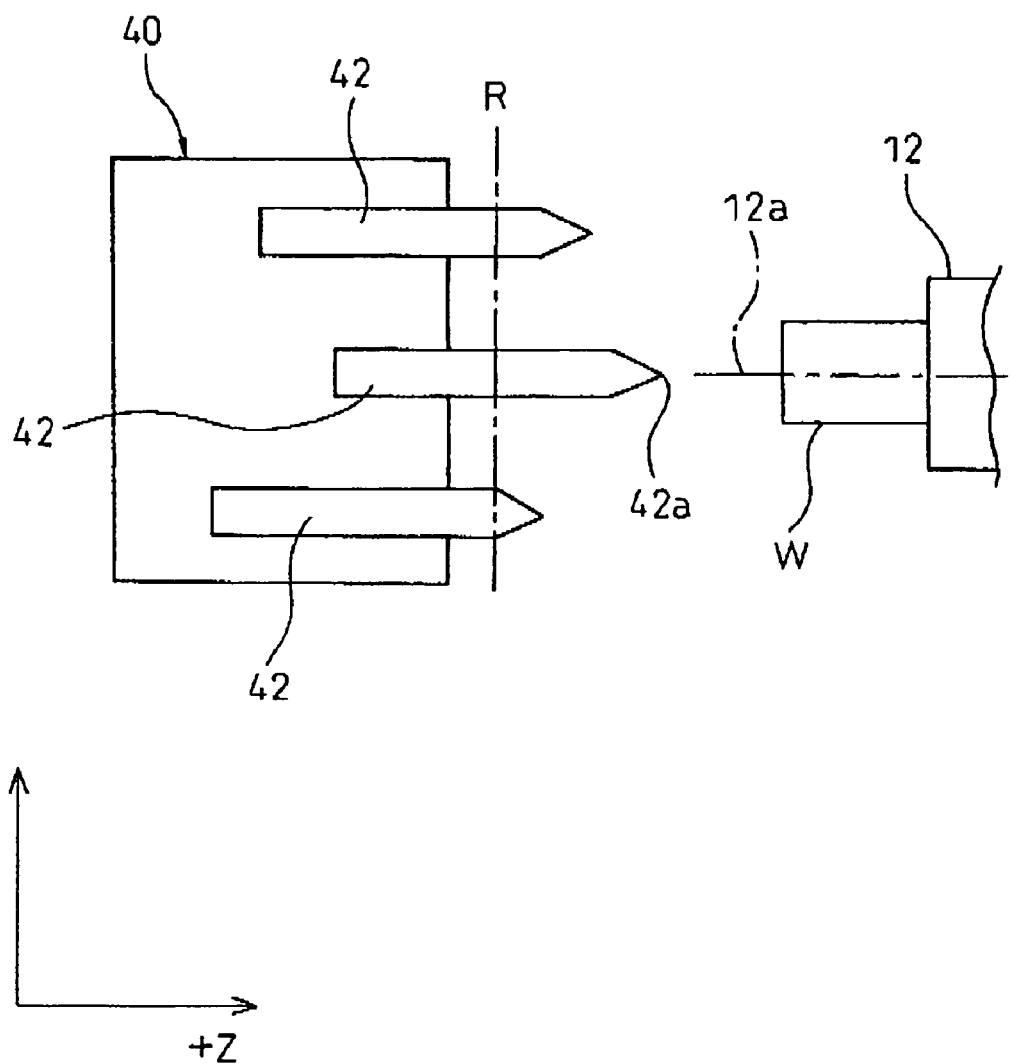

TOOL SELECTION METHOD FOR MACHINE TOOL, CONTROL DEVICE, AND NUMERICALLY CONTROLLED LATHE

TECHNICAL FIELD

The present invention relates to a tool selection method for a machine tool. The present invention also relates to a control device for carrying out tool selection in a machine tool, and a numerically controlled lathe provided with such a control device.

BACKGROUND ART

In the field of machine tools (e.g., numerically controlled (NC) lathes), a configuration has been known in which a tool rest capable of carrying a plurality of tools, such as cutting tools, drills, etc., as to be mounted thereon in a parallel arrangement (hereinafter referred to as "a gang tool rest") is provided, in such a manner that the gang tool rest can be operated for feed-motion along two control axes (e.g., X-axis and Y-axis) orthogonal to each other on a lathe bed. A plurality of tools are mounted on the gang tool rest in parallel to and spaced from each other, with the respective tips or distal ends thereof being oriented in an identical direction. In an NC lathe provided with the gang tool rest, when a workpiece is to be machined with a desired tool on the gang tool rest, the position coordinates of the rotation center axis of the workpiece are applied to the origin of a workpiece coordinate system, and the target position of the tip or distal end of the tool is instructed in the workpiece coordinate system.

During the execution of a series of machining programs for a workpiece, in order to select a tool to be used, in each machining step, from a plurality of tools mounted on the gang tool rest, the gang tool rest is shifted to a retracted location in which the tips of the plural tools do not come into contact with the workpiece, and is operated, as a feed-motion, in a first control-axis direction (e.g., a Y-axis direction) parallel to the laying direction of the tools arranged side-by-side. Then, at an instant when the tip of the selected tool is aligned with the rotation center axis of the workpiece in a second control-axis direction (e.g., an X-axis direction) orthogonal to the first control axis direction, the tool selection process is completed. From this state, the gang tool rest is operated, as a feed-motion, in the second control-axis direction, and the tip or distal end of the selected tool is abutted to the workpiece so as to perform machining. The term "a tip of a tool" or "a distal end of a tool", as used herein, refers to the part of a tool which first comes into contact with the workpiece in a machining operation.

The plural tools mounted on the gang tool rest may be arranged with the respective tips thereof being regularly positioned to be spaced the same distance from a standard tip position previously set as a characteristic value of the gang tool rest, or may be arranged with the respective tips being irregularly positioned to be spaced by different distances from the standard tip position. In a case where the above-described tool selection method is carried out, in a conventional NC lathe, for a gang tool rest carrying plural tools mounted to have irregular tip positions, the gang tool rest is retracted in the second control-axis direction to a location where the longest tool among all tools mounted on the gang tool rest (i.e., the tool having a largest tip distance between the tip position of each tool and the standard tip position) does not come into contact with the workpiece and, in this state, the subsequent tool selection (or replacement) operation in the first control-axis direction is performed. Alternatively, the gang tool rest may be retracted in the second control-axis direction up to a limit, in the travel of the gang tool rest, permitted in terms of machine construction.

In a case where the tool selection method is carried out, in the conventional NC lathe, for the gang tool rest carrying plural tools having irregular tip positions, the data of the outer diameter of the workpiece, the maximum tip distance from the standard tip position to the tip position of the longest tool, the clearance distance for slightly spacing the tip of the longest tool from the workpiece during tool selection, and the tip position (as coordinates on a second control-axis) of each tool, are provided. After the machining operation using a currently selected tool is completed, an NC device processes this data, so as to move the gang tool rest along the second control axis to the retracted location and in the first control-axis direction to the retracted location and thus selects a next designated tool to be used thereafter, in the manner as described above. In the program of this tool selection method, a plurality of control blocks, such as a coordinate-system shift block for shifting a workpiece coordinate system from a location for the currently selected tool to a location for the next designated tool, a tool-tip positioning block for moving the next designated tool from a selection completing position to a machining position, a coordinate-system restoring block for restoring the workpiece coordinate system to a reference position, and so on, are described subsequently to a tool-number designation block for selecting a tool (due to this designation, tool selection is automatically performed).

The retracting motion of the gang tool rest to a location where the longest tool on the tool rest does not come into contact with the workpiece or a limit location in the permissible travel of the tool rest, conducted to carry out a tool selection for the gang tool rest on which plural tools are mounted at irregular tip positions, is unnecessary step in a feed motion and is essentially useless in a machining operation and results in an increase in the idle time. As a result, if the tool selection is performed many times, the cycle time of the machining program is increased significantly, and a reduction in time of a manufacturing process is thereby obstructed. In the above-described program of the tool selection method in the conventional NC lathe, it is necessary to describe the control blocks, such as the coordinate-system shifting block executed before a machining-step control block, in addition to the tool-number designation block, which has been a considerable burden imposed upon programmers.

DISCLOSURE OF THE INVENTION

It is an object of the present invention to provide a tool selection method, in a machine tool including a tool rest capable of operating, as a feed-motion, along two control axes orthogonal to each other, wherein it is possible to eliminate a useless feed motion of the tool rest during the tool selection, and thus to effectively suppress the increase in the cycle time of a machining program.

It is another object of the present invention to provide a tool selection method, in a machine tool including a tool rest capable of operating, as a feed-motion, along two control axes orthogonal to each other, wherein it is possible to significantly simplify the preparation of a tool selection program.

It is a further object of the present invention to provide a control device for carrying out the above-described tool selection method in a machine tool.

It is still another object of the present invention to provide a numerically controlled lathe provided with such a control device.

In order to accomplish the above objects, the present invention provides a tool selection method, in a machine tool including a tool rest movable along first and second control axes orthogonal to each other, for automatically selecting a desired tool from a plurality of tools mounted on the tool rest in a parallel arrangement laid in a first control-axis direction with respective tips thereof being oriented in an identical direction, the method comprising setting an inherent standard tip position for the tool rest; setting a clearance distance for slightly spacing the tips of the tools from a workpiece during tool selection; determining tip distances of all of the tools mounted on the tool rest, each tip distance being defined from the standard tip position to an actual tip position on the tool rest; identifying a maximum tip distance among the tip distances, in relation to a currently selected tool as to be firstly used, a next designated tool as to be secondary used and an intermediate tool, if any, disposed between the currently selected tool and the next designated tool, in the all of the tools; moving the tool rest in a second control-axis direction after a machining operation using the currently selected tool is completed, and placing the tool rest at a tool-change starting position where a tip of the currently selected tool is spaced from the workpiece along the second control axis by a distance provided by adding the clearance distance to a difference between the maximum tip distance and a tip distance of the currently selected tool; moving the tool rest from the tool-change starting position in the first control-axis direction, and placing the tool rest at a tool-change terminating position where a tip of the next designated tool is aligned with the workpiece in the second control-axis direction; and moving the tool rest from the tool-change terminating position in the second control-axis direction, and placing the tool rest at a tool-selection completing position where the tip of the next designated tool is spaced from the workpiece by the clearance distance along the second control axis.

In a preferred embodiment, identifying the maximum tip distance is carried out during a process of machining the workpiece.

It is advantageous that the method further comprises, after placing the tool rest at the tool-selection completing position, shifting an origin of a workpiece coordinate system, which has been set at a rotation center of the workpiece in relation to the currently selected tool, by a distance corresponding to a difference between the tip distance of the currently selected tool and a tip distance of the next designated tool in the second control-axis direction, and setting a workpiece coordinate system for the next designated tool.

Also, it is preferred that the method further comprises, after determining the tip distances of all of the tools mounted on the tool rest, comparing the tip distances of all of the tools with each other.

In this arrangement, it is advantageous that, in a case where all of the tip distances are identical to each other as a result of comparing the tip distances of all of the tools, the maximum tip distance is not identified, the tool rest is moved in the second control-axis direction and is placed at a position at which the tip of the currently selected tool is spaced from the workpiece by a distance corresponding to the clearance distance along the second control axis, and the position is set as the tool-change starting position.

The present invention also provides a control device for carrying out a tool selection method described above, comprising a storage section for storing the clearance distance and the tip distances of all of the tools mounted on the tool rest, as inherent data of the tool rest; a processing section for calculating, from the inherent data stored in the storage section, the maximum tip distance as well as the tool-change starting position, the tool-change terminating position and the tool-selection completing position, to issue a position command corresponding to these positions; and a drive control section for controlling, in accordance with the position command issued from the processing section, a feed motion of the tool rest along the first and second control axes.

The above control device may comprise a numerical control device.

The present invention further provides a numerically controlled lathe provided with the control device as described above.

BRIEF DESCRIPTION OF THE DRAWINGS

The above and other objects, features and advantages of the present invention will become more apparent from the following description of preferred embodiments in connection with the accompanying drawings, in which:

FIG. 7 is a schematic front view typically showing the configuration of another tool rest to which the tool selection method according to the present invention can be applied.

BEST MODES FOR CARRYING OUT THE INVENTION

Figure 1:
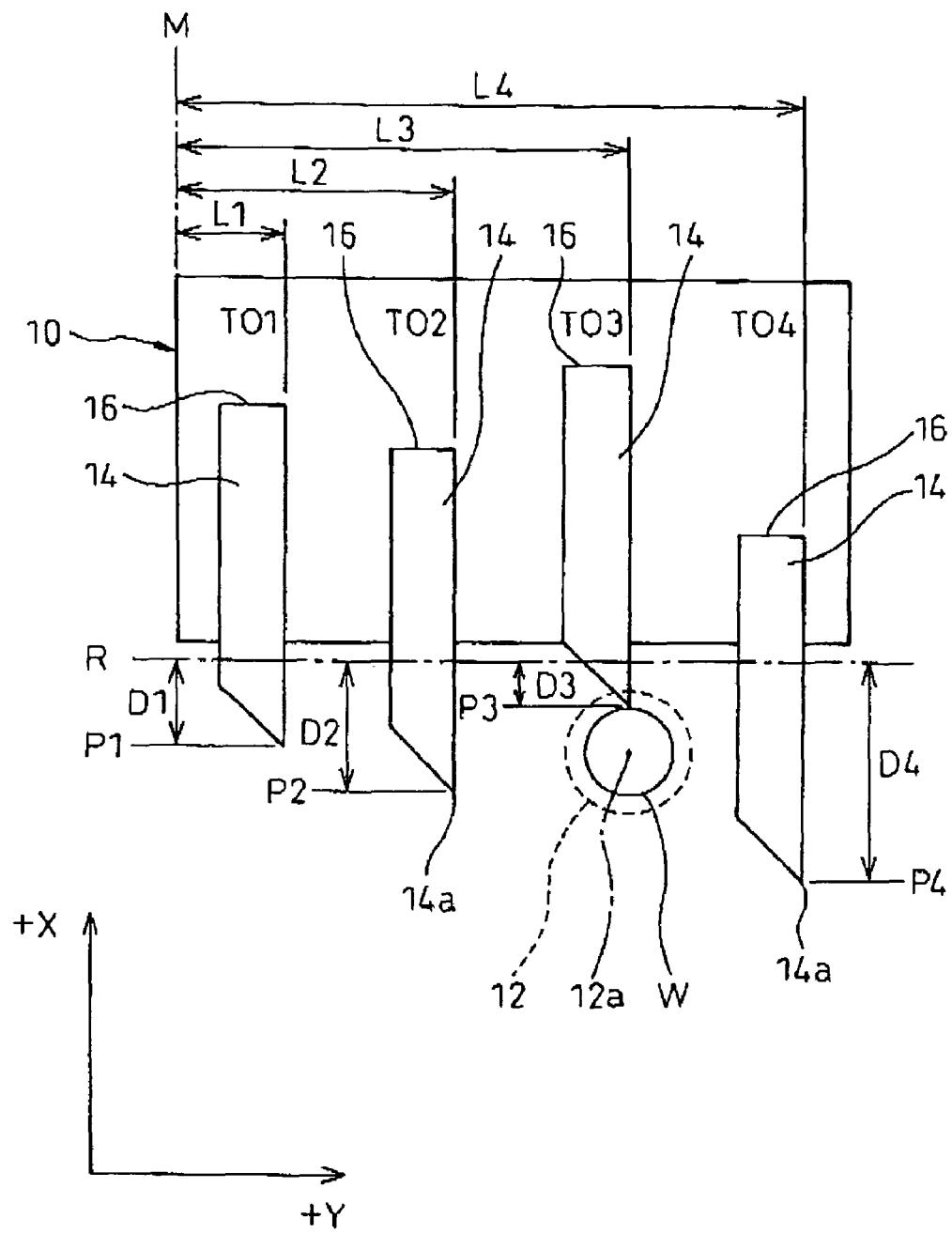
FIG. 1 is a schematic front view typically showing the configuration of a tool rest in a machine tool, to which a tool selection method according to the present invention can be applied, in a state where a machining operation using a currently selected tool is completed.
Figure 2:
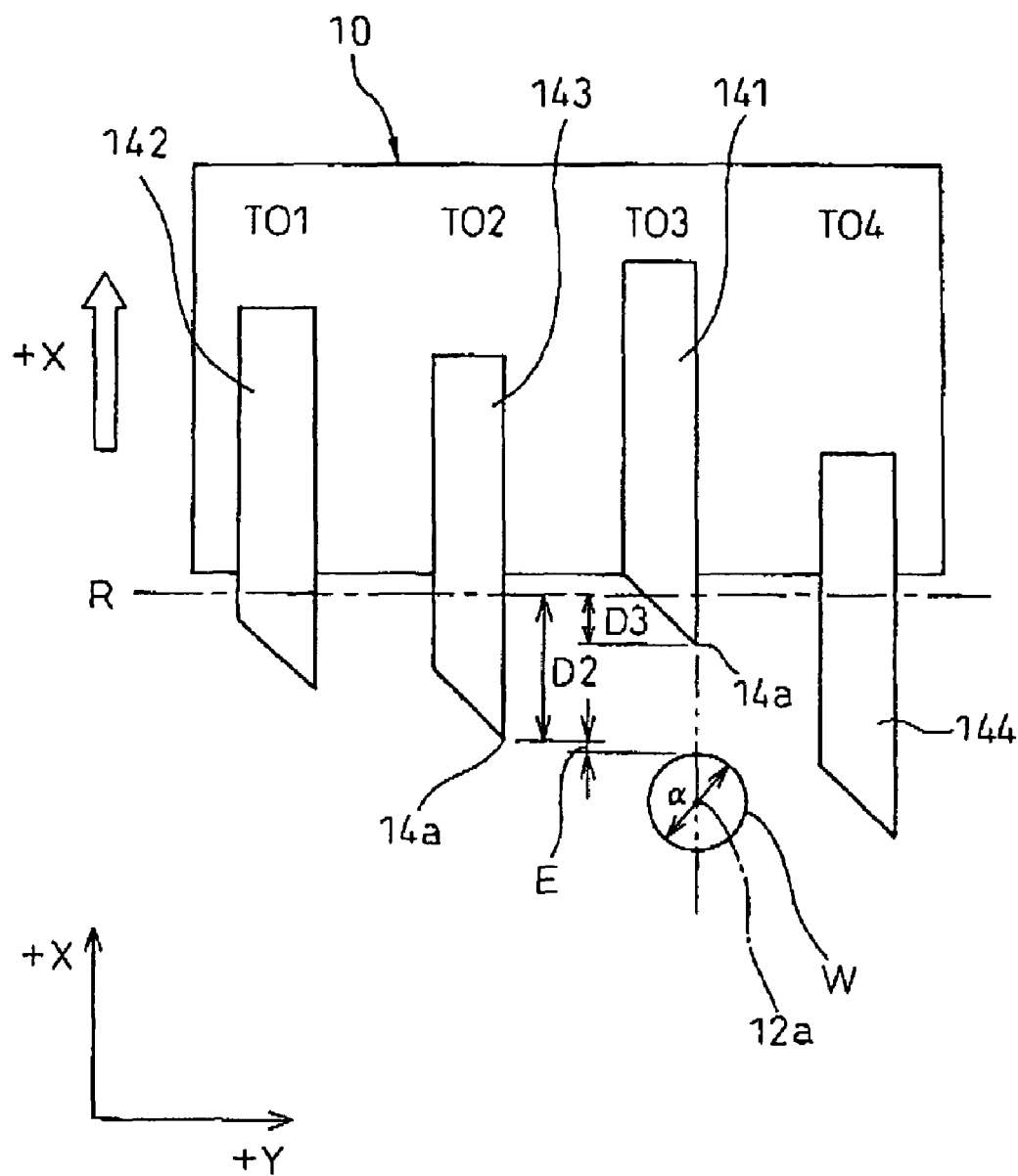
FIG. 2 is a schematic front view showing the tool rest of FIG. 1 at a tool-change starting position.

The embodiments of the present invention are described below in detail, with reference to the accompanying drawings. In the drawings, the same or similar components are denoted by common reference numerals.

Referring to the drawings, FIG. 1 schematically shows a tool rest 10 in a machine tool, which allows a tool selection method according to the present invention to be carried out conveniently. In the illustrated embodiment, the tool rest 10 is adapted to be installed in a numerically controlled (NC) lathe, and has such a configuration as to be operable, as a feed-motion, on a lathe bed (not shown) along a first control axis (Y-axis) and a second control axis (X-axis) orthogonal to each other. The NC lathe includes a spindle 12 rotating with a workpiece W securely held thereon, and the tool rest 10 is installed on the lathe bed with both the first and second control axes thereof being oriented orthogonally to the rotation axis 12a of the spindle 12.

The tool rest 10 is a so-called gang tool rest capable of carrying a plurality of tools 14, such as cutting tools, drills, etc., in a parallel arrangement. The tools 14 are securely mounted on the tool rest 10 in a parallel arrangement wherein the tools are laid in parallel to and spaced from each other in a first control-axis (Y-axis) direction, with respective tips or distal ends 14a of the tools being oriented in an identical direction. The tool rest 10 is provided with a plurality of tool mount portions 16 to which the plural tools 14 are securely and individually mounted, and tool numbers T01 to T04 are assigned to the tool mount portions 16. The tool rest 10 possesses an inherent standard tip position (or a reference plane) R (shown by a dashed line) set in order to identify the tip position on the tool rest 10 for each tool 14 mounted to the tool mount portion 16. In the illustrated embodiment, the plural tools 14 are mounted on the tool rest 10 in such a manner that the positions P1 to P4 of the respective tips 14a are irregularly disposed in relation to the standard tip position R, in other words, that the distances D1 to D4 between the standard tip position R and the tip positions P1 to P4 of the tools 14 (measured along the second control axis (X-axis); i.e., tip distances) are variously defined (see FIG. 1).

Next, a tool selection method, according to an embodiment of the present invention, for automatically selecting a tool 14 to be used for respective machining steps from among the plural tools 14 mounted on the tool rest 10, during the execution of a series of machining programs in relation to a workpiece W in the NC lathe having the above configuration, will be described below with reference to FIGS. 1 to 4.

First, the above-described standard tip position R inherent to the tool rest 10 is set, and for all tools 14 mounted on the tool rest 10, the tip distances D1 to D4 (measured along X-axis) defined from the standard tip position R to respective actual tip positions P1 to P4 (as X-coordinates) are determined (FIG. 1). Also, for all tools 14 mounted on the tool rest 10, the tip positions L1 to L4 (as Y-coordinates) of each tool 14, with respect to a machine origin M in Y-axis previously set on the lathe bed, are identified (FIG. 1). On the other hand, a clearance distance E (FIG. 2) is set for slightly (typically about 1 mm) spacing the tips of the tools 14 from the outer circumferential surface of the workpiece W during tool selection.

Next, in connection with, among all tools 14, a currently selected tool 141 (FIG. 2) being used for a machining operation (in the illustrated example, a tool denoted by tool number T03), a next designated tool 142 (FIG. 2) as will be thereafter used (in the illustrated example, a tool denoted by tool number T01), and an intermediate tool 143 (FIG. 2), if any, disposed between the currently selected tool 141 and the next designated tool 142 (in the illustrated example, a tool denoted by tool number T02), the maximum tip distance (D2, in the illustrated example) is identified from among the tip distances of these tools. If there is no intermediate tool, the maximum tip distance is identified from the currently selected tool 141 and the next designated tool 142. After the machining operation using the currently selected tool 141 is completed, the tool rest 10 is operated, as a feed-motion, in +(plus)X-axis direction, and is placed at a tool-change starting position where the tip 14a of the currently selected tool 141 is spaced from the outer circumferential surface of the workpiece W along X-axis by a distance (D2−(minus)D3+(plus)E) provided by adding the clearance distance E to a difference (positive value) between the maximum tip distance (D2) and the tip distance (D3) of the currently selected tool 141 (see FIG. 2).

Figure 3:
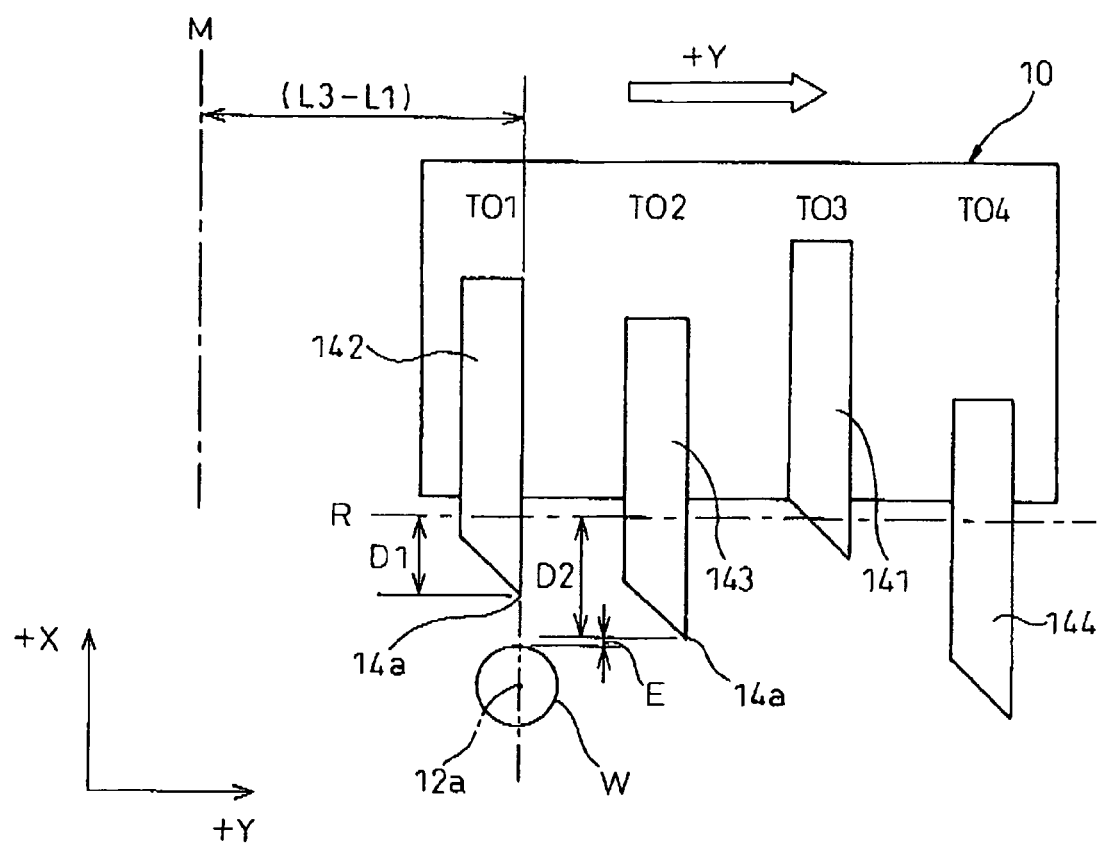
FIG. 3 is a schematic front view showing the tool rest of FIG. 1 at a tool-change terminating position.

Then, the tool rest 10 is operated, as a feed-motion, from the tool-change starting position (FIG. 2) in +(plus)Y-axis direction, and is placed at a tool-change terminating position where the tip 14a of the next designated tool 142 is aligned, in an X-axis direction, with the rotation center axis of the workpiece W, i.e., with a spindle rotation axis 12a (see FIG. 3). Basically, the tool-change terminating position is a position spaced from the tool-change starting position along Y-axis by a distance (L3−(minus)L1) equal to a difference (positive or negative value) between the tip position L3 of the currently selected tool 141 and the tip position L1 of the next designated tool 142 on Y-axis at the tool-change starting position. In the case where the currently selected tool 141 is a rotary tool such as a milling cutter, despite the tip of the currently selected tool 141 not being positioned, upon completion of the machining operation, to be aligned with the spindle rotation axis 12a in the X-axis direction, the tool-change starting position may sometimes be defined by a position to which the tool rest 10 is operated, as a feed-motion, in +(plus)X-axis direction from such a misaligned position. In this case, however, the distance between the tool-change starting position and the tool-change terminating position is not equal to (L3−(minus)L1). During this feed motion in Y-axis direction (i.e., a tool change operation), the intermediate tool 143 having the maximum tip distance D2, among the currently selected tool 141, the next designated tool 142 and the intermediate tool 143, passes through a position where the tip 14a is spaced from the outer circumferential surface of the workpiece W by the clearance distance E along X-axis.

Figure 4:
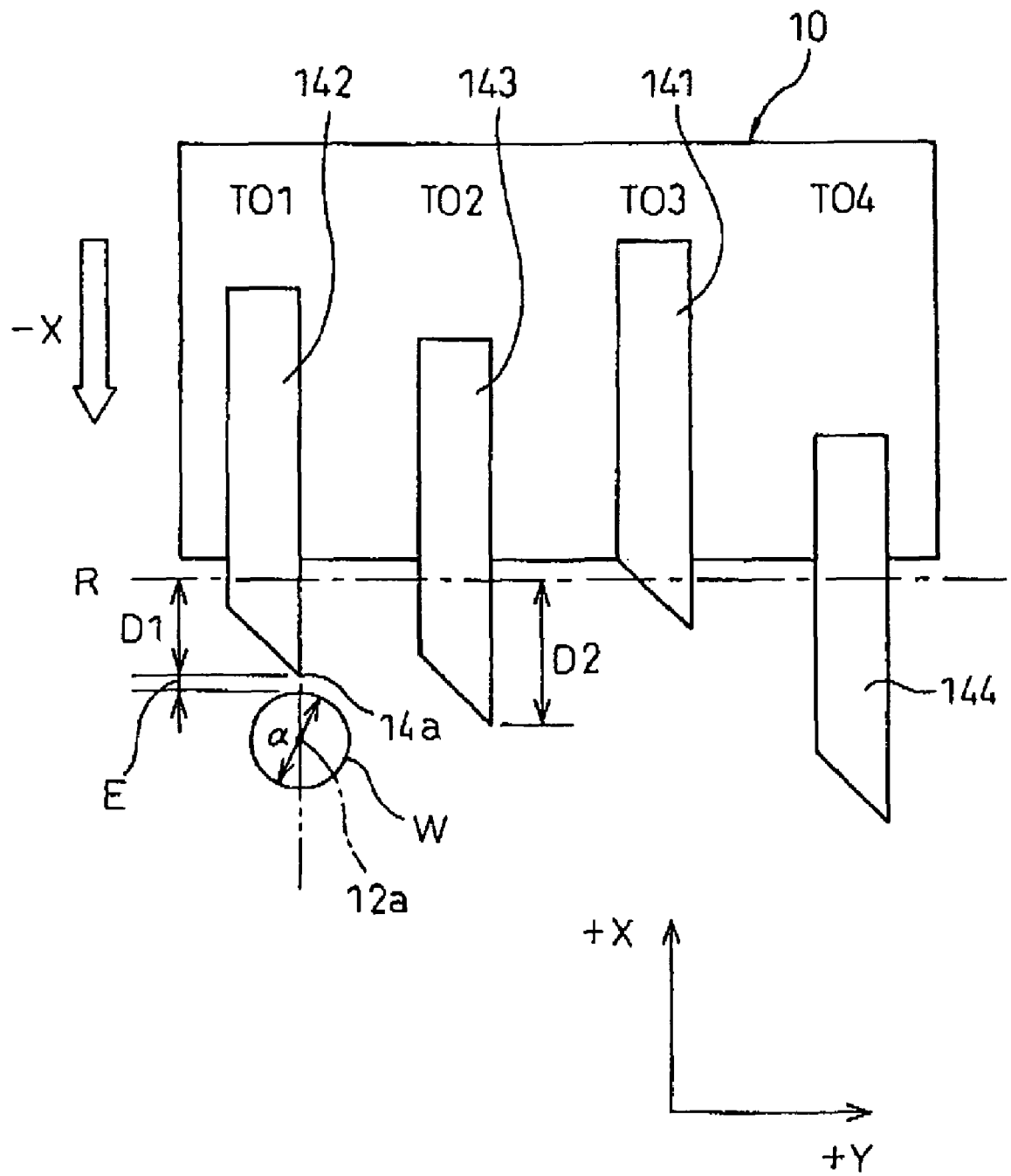
FIG. 4 is a schematic front view showing the tool rest of FIG. 1 at a tool-selection completing position.

Finally, the tool rest 10 is operated, as a feed-motion, from the tool-change terminating position (FIG. 3) in −(minus)X-axis direction, and is placed at a tool-selection completing position where the tip 14a of the next designated tool 142 is spaced from the outer circumference of the workpiece W by the clearance distance E along X-axis (see FIG. 4). Tool selection operation is thereby completed. Note that the tool-selection completing position is a position spaced from the tool-change terminating position along X-axis by a distance equal to a difference between the maximum tip distance (D2) and the tip distance (D1) of the next designated tool 142.

In the tool selection method as described above, in order to safely accomplish a tool change operation for Y-axis feed-motion in a tool rest 10 carrying the plural tools 14 at irregular tip positions, the tool rest 10 is retracted to a position where the intermediate tool 143 having the maximum tip distance D2, among the currently selected tool 141, the next designated tool 142 and the intermediate tool 143, does not come into contact with the workpiece W. This retraction motion is a minimum necessary motion required to avoid interference between the tool 14 and the workpiece W during the feed motion of the tool along Y-axis. Therefore, compared to a prior art method, by which a tool rest is retracted to a position where a tool having a maximum tip distance among all mounted tools (in the illustrated example, the tool 144 denoted by tool number T04) does not come into contact with a workpiece, or to a limit position of the permissible travel of the tool rest, an unnecessary feed motion of the tool rest is eliminated as far as possible, and an idle time during a machining operation is thereby effectively reduced. As a result, even if a tool selection is performed many times, it is possible to significantly suppress an increase in a cycle time of a machining program.

The tool rest 10 carries out the X-axis feed motion and the Y-axis feed motion as described above, in accordance with a previously-input machining program, under the control of, e.g., a numerical control device (hereinafter referred to as an NC device) provided for the NC lathe, so as to select the desired tool 14 in an indexing manner, and to move, for a machining operation, the tip 14a of the selected tool 14 in a direction toward and away from the workpiece W. Upon performing the machining operation, the position coordinates of the rotation center axis of the workpiece W, i.e., the rotation axis 12a of the spindle 12, is applied as the origin of a workpiece coordinate system, and the target position of the tip 14a of the tool 14 is commanded on the workpiece coordinate system.

In the case where the above-described tool selection method is performed under the control of the NC device, a positional correlation between the tool rest 10 and the workpiece W during machining is altered between a machining step using the currently selected tool 141 and a machining step using the next designated tool 142, not only in Y-axis direction but also in X-axis direction. Therefore, it is also necessary to set the workpiece coordinate system to command a tool tip position at respective suitable locations different between before and after the tool selection. In the above-described method, at the instant when the tool rest 10 is placed at the tool-change terminating position, first in connection with the Y-axis, the origin of the workpiece coordinate system, which has been set at the Y-axis tip position of the currently selected tool 141, is shifted in the Y-axis direction to the Y-axis tip position of the next designated tool 142. Then, after the tool rest 10 is placed at the tool-selection completing position, in connection with X-axis, the origin of the workpiece coordinate system, which has been set at the rotation center 12a of the workpiece W with reference to the currently selected tool 141, is shifted in X-axis direction by a distance (D3−(minus)D1) equal to a difference (positive or negative value) between the tip distance D3 of the currently selected tool 141 and the tip distance D1 of the next designated tool 142. Thereby, it is possible to set the workpiece coordinate system for the next designated tool 142.

On the other hand, in the case where the tip distances D1 to D4 of all tools 14 mounted on the tool rest 10 are identical to each other, it is not necessary to determine the maximum tip distance, and therefore, it is advantageous to adopt the following procedure in view of reduction in a calculating operation time. Specifically, after the tip distances D1 to D4 of all the tools 14 mounted on the tool rest 10 are determined, the tip distances D1 to D4 of the tools 14 are compared with each other. If all of the tip distances D1 to D4 are identical to each other, the calculating operation for identifying the maximum tip distance is omitted, and the tool rest 10 is operated, as a feed-motion, in X-axis direction, and is placed at a position where the tip 14a of the currently selected tool 141 is spaced from the workpiece W along X-axis by a distance equal to the clearance distance E. Then, this position is applied as the tool-change starting position, and the tool change operation by a subsequent feed motion along Y-axis is performed. With this configuration, the tool rest 10 is operated for minimum retraction necessary to prevent the interference between the tool 14 performing Y-axis feed motion and the workpiece W, so that it is also possible to eliminate the unnecessary feed motion of the tool rest 10 as far as possible.

Figure 5:
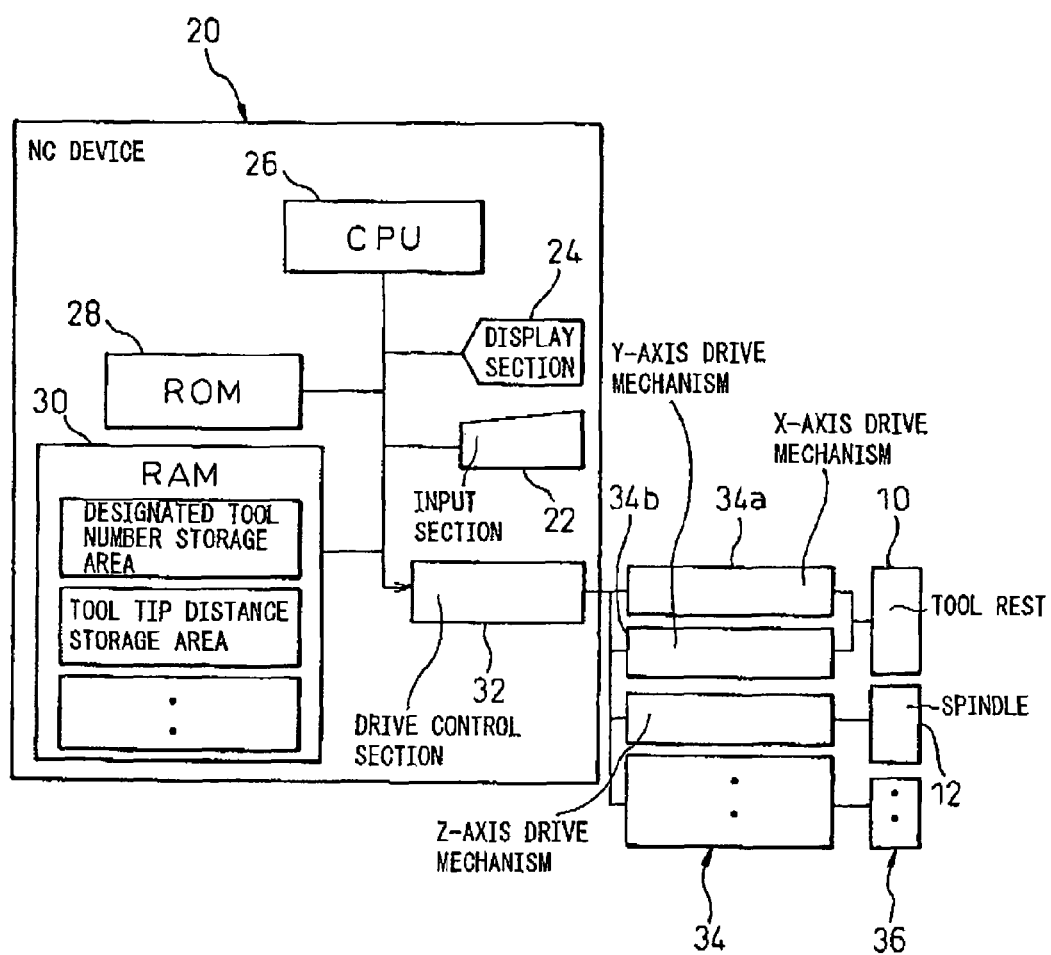
FIG. 5 is a block diagram showing the configuration of a control device capable of carrying out the tool selection method according to the present invention.

Next, referring to FIG. 5, the configuration of a control device, according to an embodiment of the present invention, for carrying out the above-described tool selection method in a NC lathe, will be described. Although, in the illustrated embodiment, the control device is configured as a NC device installed in the NC lathe, the present invention is not limited to this configuration, but an alternative control device, other than the NC device, may be used.

The NC device 20 includes an input section 22, a display section 24, a processing section (CPU) 26, a storage section (ROM 28 and RAM 30), and a drive control section 32. The input section 22 is provided with, for example, a keyboard including numerical keys (not shown), and acts to permit data (such as tool selection, shapes and dimensions of machined article, rotation speed of spindle, feed speed of tools, etc.) required for controlling the respective operations of the tool rest 10 and the spindle 12 in the NC lathe, as well as a machining program (i.e., a block sequence) for each tool 14, including these data, to be input through the input section 22. The display section 24 is provided with a display unit (not shown), such as CRT (cathode ray tube), LCD (liquid crystal display) or the like, and acts to permit the data and/or the machining program input through the input section 22 to be displayed on the display unit, and to enable an automatic programming, accompanying a simulation, to be accomplished interactively on the display unit.

A control program for driving the tool rest 10 and the spindle 12 is previously stored in ROM 28 of the storage section. RAM 30 is provided with storage areas for storing various data relating to a tool selection function, such as a designated tool number storage area, a tool tip distance storage area, etc. Also, data relating to the plural tools 14 and the machining programs containing these data, which are input through the input section 22, are stored in ROM 28 or RAM 30 in accordance with the instruction from CPU 26. CPU 26 outputs an operation command to the drive control section 32 on the basis of various data and machining program stored in ROM 28 or RAM 30 and the control program stored in ROM 28. The drive control section 32 controls various drive mechanisms 34 respectively in accordance with the operation command from CPU 26, so as to make the drive mechanisms respectively actuate movable structures 36 provided on the NC lathe, such as the tool rest 10, the spindle 12, etc.

Figure 6:
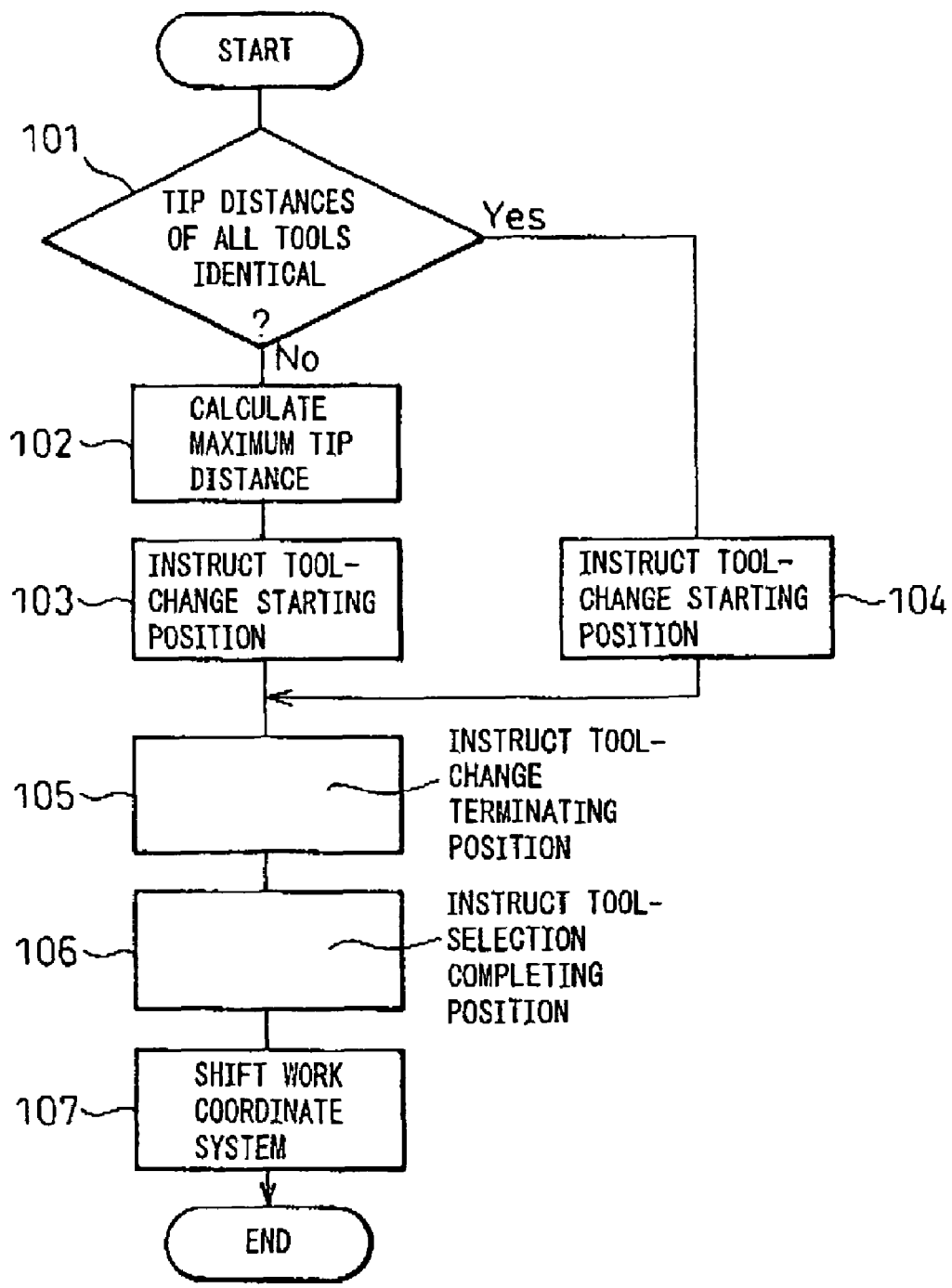
FIG. 6 is a flow chart showing the procedure of tool selection by using the control device of FIG. 5.

The tool selection method performed during the machining process of the workpiece W under the control of the NC device having the above-described configuration will be described below, in relation to the embodiment shown in FIGS. 1 to 4, with reference to a flow chart of FIG. 6. In order to perform the tool selection method, the inherent data of the machining program, such as the diameter a of the workpiece W (FIG. 2), the clearance distance E, the tip distances D1 to D4 of all tools 14, and Y-axis tip positions L1 to L4 of all tools 14, are previously stored in RAM 30 of the NC device 20, When a tool selection start command is sent to the NC device 20, CPU 26 first reads out the data stored in RAM 30 and judges whether the tip distances D1 to D4 of all tools 14 mounted on the tool rest 10 are identical to each other (step 101). If any tool has a different tip distance, CPU 26 calculates, in connection with the currently selected tool 141, the next designated tool 142 and the Intermediate tool 143, the maximum tip distance D2 among the tip distances D1 to D3 thereof (Step 102). In this connection, even if the values D1 to D3 are identical to each other, and if only the value D4 is different therefrom, the routine proceeds to Step 102 to calculate the maximum tip distance (i.e., any one of D1 to D3). The calculated maximum tip distance D2 is stored in RAM 30.

Note that the maximum tip distance D2 is usually identified during the machining operation of the workpiece W and at an instant when the tool selection start is commanded, as described above. Alternatively, the identification of the maximum tip distance D2 may be executed as a preliminary operation when the above-described inherent data for the machining program are stored in RAM 30 of the NC device 20. It is also possible to execute the comparison of the tip distances D1 to D4 in the same way.

Next, CPU 26 calculates the tool-change starting position of the tool rest 10 along X-axis, using the data, stored in RAM 30, of the workpiece diameter a, the clearance distance E, the tip distances D1 to D4 and the maximum tip distance D2, and instructs the calculated tool-change starting position, as an X-coordinate data, to the drive control section 32 (Step 103). The drive control section 32 controls the X-axis drive mechanism 34a (FIG. 5) of the tool rest 10 in accordance with the above instruction, so as to make the tool rest 10 operate, as a feed-motion, in +(plus)X-axis direction, as already described. In this connection, the tool-change starting position of the tool rest 10 is designated in the workpiece coordinate system defined in relation to the currently selected tool 141, and its X-coordinate is [α/2+(plus)E+(plus) D2].

If it is judged, in Step 101, that the tip distances D1 to D4 of all tools 14 are identical (D), CPU 26 does not calculate the maximum tip distance, but calculates the tool-change starting position of the tool rest 10 along the X-axis and passes it to the drive control section 32, using the data, stored in RAM 30, of the workpiece diameter, the clearance distance E and the tip distance D (Step 104). This procedure reduces the calculation operation time in CPU 26. In this arrangement, the tool-change starting position of the tool rest 10 is designated in the workpiece coordinate system defined in relation to the currently selected tool 141, and its X-coordinate is [α/2+(plus) E+(plus) D].

Then, CPU 26 calculates the tool-change terminating position of the tool rest 10 along the Y-axis, using the data, stored in RAM 30, of the Y-axis tip distances L1 to L4, and instructs the calculated tool-change terminating position, as Y-coordinate data, to the drive control section 32 (Step 105). In accordance with this instruction, the drive control section 32 controls the Y-axis drive mechanism 34b (FIG. 5) of the tool rest 10, so as to make the tool rest 10 operate, as a feed-motion, from the tool-change starting position in +(plus)Y-axis direction, as already described. In this connection, the tool-change terminating position of the tool rest 10 is designated in the workpiece coordinate system defined in relation to the currently selected tool 141, and its Y-coordinate is [L3−(minus) L1)]. After instructing the tool-change terminating position, CPU 26 shifts the origin of the workpiece coordinate system, which has been set at the Y-axis tip position of the currently selected tool 141, in Y-axis direction to the Y-axis tip position of the next designated tool 142, so as to execute a data shift operation with respect to Y-axis.

Next, CPU 26 calculates the tool-selection completing position of the tool rest 10 along the X-axis, using the data, stored in RAM 30, of the workpiece diameter α, the clearance distance E, the tip distances D1 to D4 and the maximum tip distance D2, and passes the calculated tool-selection completing position, as X-coordinate data, to the drive control section 32 (Step 106). In accordance with this instruction, the drive control section 32 controls the X-axis drive mechanism 34a (FIG. 5) of the tool rest 10, so as to make the tool rest 10 operate, as a feed-motion, in the −(minus)X-axis direction from the tool-change terminating position, as already described. In this connection, the tool-selection completing position of the tool rest 10 is designated in the workpiece coordinate system defined in relation to the currently selected tool 141, and its X-coordinate is [α/2+(plus)E+(plus) D1].

After instructing the tool-selection completing position, CPU 26 shifts the origin of the workpiece coordinate system, which has been set at the rotation center 12a of the workpiece W in connection with the currently selected tool 141, in X-axis direction by a distance (D3−(minus)D1) equal to a difference (positive or negative value) between the tip distance D3 of the currently selected tool 141 and the tip distance D1 of the next designated tool 142, so as to execute a data shift operation with respect to X-axis (Step 107). The workpiece coordinate system for the next designated tool 142 is set in this manner.

The above-described NC device 20 can be configured in such a manner that processes in Step 101 to Step 107 of the tool selection method can be accomplished in a normal order, only by describing the control block (e.g., T0100) designating the tool number of the next designated tool in the machining program. In this arrangement, even when the tool selection is repeated in a series of machining programs, only one control block needs to be described for each tool selection command, so that it is possible to significantly facilitate a program preparing operation.

The above-described tool selection method, according to the present invention, can be conveniently applied to a tool rest 40 exclusively used for drilling tools, such as drills, each of which can be disposed axially in front of a workpiece W securely held by a spindle, as shown in FIG. 7. The tool rest 40 has a construction like a gang tool rest capable of carrying a plurality of drilling tools 42, such as drills, and is able to operate, as a feed-motion, in a first control axis (Y-axis) direction orthogonal to the rotation axis 12a of the spindle 12 and in a second control axis (Z-axis) direction parallel to the rotation axis 12a. The drilling tools 42 are securely mounted on the tool rest 40 in a parallel arrangement wherein the tools are parallel to and spaced from each other in the Y-axis direction, with respective tips or distal ends 42a of the tools being oriented in an identical direction. The tool rest 40 possesses an inherent standard tip position (or a reference plane) R (shown by a dashed line) set in order to identify the tip position on the tool rest 40 for each tool 42. In the illustrated embodiment, the plural tools 42 are mounted on the tool rest 40 in such a manner that the positions of the respective tips 42a are irregularly disposed in relation to the standard tip position R. It will be understood that the above-described tool selection method can also be suitably performed for the tool rest 40 as described.

It should be noted that any of the tool selection method, the control device and the NC lathe, according to the present invention, can be applied to another configuration wherein, for example, the above-described gang tool rest carries both rotary tools such as drills and cutting tools, in a way similar to the illustrated embodiment, and can possess the same operative effects. Also, the tool selection method or the control device, according to the present invention, can be suitably applied not only to the NC lathe but also to the other automatically-controlled machine tools.

As will be apparent from the foregoing description, according to the present invention, it becomes possible, for a tool selection method in a machine tool including a tool rest capable of operating, as a feed-motion, along two control axes orthogonal to each other, to eliminate a useless feeding of the tool rest during the tool selection, and thus to effectively suppress the increase in the cycle time of a machining program. Further, according to the present invention, it is possible to significantly simplify the preparation of a tool selection program.

While some preferred embodiments according to the present invention has been described above, it will be understood that the invention is not restricted to those embodiments and that various changes and modifications may be made without departing from the disclosure of the claims.

The invention claimed is:

1. A tool selection method, in a machine tool including a tool rest movable along first and second control axes orthogonal to each other, for automatically selecting a desired tool from a plurality of tools mounted on said tool rest in a parallel arrangement laid in a first control-axis direction with respective tips thereof being oriented in an identical direction, said method comprising:

setting a standard tip position ingerent to said tool rest;

setting a clearance distance for spacing said tips of said tools from a workpiece during tool selection;

determining tip distances of all of said tools mounted on said tool rest, each tip distance being defined from said standard tip position to an actual tip position on said tool rest;

identifying a maximum tip distance among said tip distances, in relation to a currently selected tool as to be firstly used, a next designated tool as to be secondary used and an intermediate tool, if any, disposed between said currently selected tool and said next designated tool, in said all of said tools;

moving said tool rest in a second control-axis direction, after a machining operation using said currently selected tool is completed, and placing said tool rest at a tool-change starting position where a tip of said currently selected tool is spaced from the workpiece along said second control axis by a distance provided by adding said clearance distance to a difference between said maximum tip distance and a tip distance of said currently selected tool;

moving said tool rest from said tool-change starting position in said first control-axis direction, and placing said tool rest at a tool-change terminating position where a tip of said next designated tool is aligned with the workpiece in said second control-axis direction; and moving said tool rest from said tool-change terminating position in said second control-axis direction, and placing said tool rest at a tool-selection completing position where said tip of said next designated tool is spaced from the workpiece by said clearance distance along said second control axis.

2. A tool selection method according to claim 1, wherein identifying said maximum tip distance is carried out during a process of machining the workpiece.

3. A tool selection method according to claim 1, further comprising, after placing said tool rest at said tool-selection completing position, shifting an origin of a workpiece coordinate system, which has been set at a rotation center of the workpiece in relation to said currently selected tool, by a distance corresponding to a difference between said tip distance of said currently selected tool and a tip distance of said next designated tool in said second control-axis direction, and setting a workpiece coordinate system for said next designated tool.

4. A tool selection method according to claim 1, further comprising, after determining said tip distances of all of said tools mounted on said tool rest, comparing said tip distances of all of said tools with each other.

5. A tool selection method according to claim 4, wherein, in a case where all of said tip distances are identical to each other as a result of comparing said tip distances of all of said tools, said maximum tip distance is not identified, said tool rest is moved in said second control-axis direction and is placed at a position at which said tip of said currently selected tool is spaced from said workpiece by a distance corresponding to said clearance distance along said second control axis, and said position is set as said tool-change starting position.

* * * * *